United States Patent
McAuliffe et al.

(10) Patent No.: US 9,132,919 B2
(45) Date of Patent: Sep. 15, 2015

(54) SPEED SENSOR MODULE AND DIFFUSER ASSEMBLY

(75) Inventors: Christopher McAuliffe, Windsor, CT (US); Michael Zager, Windsor, CT (US)

(73) Assignee: Hamilton Sundstrand Corporation, Windsor Locks, CT (US)

(*) Notice: Subject to any disclaimer, the term of this patent is extended or adjusted under 35 U.S.C. 154(b) by 867 days.

(21) Appl. No.: 13/347,979

(22) Filed: Jan. 11, 2012

(65) Prior Publication Data
US 2013/0177399 A1 Jul. 11, 2013

(51) Int. Cl.
*F04D 27/00* (2006.01)
*B64D 13/06* (2006.01)
*F01D 17/06* (2006.01)
*F01D 21/00* (2006.01)
*F25B 9/00* (2006.01)

(52) U.S. Cl.
CPC ............. *B64D 13/06* (2013.01); *F01D 17/06* (2013.01); *F04D 27/001* (2013.01); *B64D 2013/0662* (2013.01); *F01D 21/003* (2013.01); *F25B 9/004* (2013.01); *F25B 2700/171* (2013.01)

(58) Field of Classification Search
CPC ....... F04D 19/02; F04D 20/08; F04D 29/545; F04D 29/547; F04D 27/001; F01D 21/003; F01D 21/10; F01D 17/02; F01D 17/06; F05B 2260/80; F25B 2700/17; F25B 2700/171; F25B 9/004; B64D 13/06; B64D 2013/0662
USPC ................. 415/118, 144, 211.2; 416/61, 175, 416/198 R; 62/244, 401, 402, 186, 129
See application file for complete search history.

(56) References Cited

U.S. PATENT DOCUMENTS

| | | | |
|---|---|---|---|
| 5,133,194 A * | 7/1992 | Army et al. | 62/401 |
| 6,434,968 B2 | 8/2002 | Buchholz et al. | |
| 6,701,715 B2 | 3/2004 | Anderson et al. | |
| 7,372,253 B2 * | 5/2008 | Biber et al. | 324/174 |
| 7,497,073 B2 * | 3/2009 | Black | 60/39.091 |
| 7,536,864 B2 | 5/2009 | Wolfe et al. | |
| 2004/0240993 A1 * | 12/2004 | Jensen | 415/211.2 |
| 2007/0186551 A1 * | 8/2007 | Ante et al. | 60/605.1 |
| 2013/0084176 A1 * | 4/2013 | Beers et al. | 415/213.1 |

FOREIGN PATENT DOCUMENTS

| | | |
|---|---|---|
| DE | 102005010921 A1 | 2/2006 |
| GB | 979936 A | 1/1965 |

OTHER PUBLICATIONS

European Search Report for Application No. 13150802.0, mailed May 15, 2013, 5 pages.

* cited by examiner

*Primary Examiner* — Dwayne J White
*Assistant Examiner* — William Grigos
(74) *Attorney, Agent, or Firm* — Cantor Colburn LLP

(57) ABSTRACT

An environmental control system, includes an air cycle machine for conditioning an interior space with cooling air, the air cycle machine including a fan coupled to a shaft that rotates about a shaft axis, the fan being located at a distal end of the air cycle machine; a speed sensor module having a speed sensor for sensing a rotational speed of the shaft; wherein the speed sensor module includes an outer portion having a first bore aligned on the shaft axis, an intermediate portion having a second bore aligned on the shaft axis, and an inner portion aligned on the shaft axis; and a diffuser assembly including a cylindrical assembly for ducting a first portion of the cooling air to an inlet side of the fan and for communicating a second portion of the cooling air directly to a discharge side of the fan without passing the inlet side.

19 Claims, 3 Drawing Sheets

SPEED SENSOR MODULE AND DIFFUSER ASSEMBLY

FIELD OF INVENTION

This invention generally relates to an air cycle machine for environmental control systems (ECSs) and, more particularly, to a speed sensor module that may be selectively connected to a fan inlet and diffuser assembly for an air cycle machine.

DESCRIPTION OF RELATED ART

Conventional aircraft environmental control systems (ECSs) incorporate an air cycle machine, also referred to as an air cycle cooling machine, for use in cooling and dehumidifying air for supply to the aircraft cabin for occupant comfort. Such air cycle machines may comprise two or more wheels disposed at axially spaced intervals along a common shaft. The wheels are part of, for example, a compressor rotor, a turbine rotor, a fan rotor or an additional turbine rotor or an additional compressor rotor. In some cases the turbine or turbines drive both the compressor and the fan.

On aircraft powered by turbine engines, the air to be conditioned in the air cycle machine is typically compressed air bled from one or more of the compressor stages of the turbine engine. In conventional systems, this bleed air is passed through the air cycle machine compressor wherein it is further compressed. The compressed air is passed through a condensing heat exchanger to cool the compressed air sufficiently to remove moisture and dehumidify the air. The dehumidified compressed air is expanded in the turbine of the air cycle machine to both extract energy from the compressed air so as to drive the shaft and also to cool the expanded turbine exhaust air before it is supplied to the cabin as conditioned cooling air. A speed sensor is generally used to measure the rotational speed of the shaft in order to diagnose faults or issues with performance. However, installing the speed sensor within the air cycle machine requires threading the associated speed sensor connection through the attached ducting and housings, resulting in a complex installation process.

BRIEF SUMMARY

According to one aspect of the invention, an environmental control system, includes an air cycle machine for conditioning an interior space with cooling air, the air cycle machine including a fan coupled to a shaft that rotates about a shaft axis, the fan being located at a distal end of the air cycle machine; a speed sensor module having a speed sensor for sensing a rotational speed of the shaft; wherein the speed sensor module includes an outer portion having a first bore aligned on the shaft axis, an intermediate portion having a second bore aligned on the shaft axis, and an inner portion aligned on the shaft axis; and a diffuser assembly including a cylindrical assembly for ducting a first portion of the cooling air to an inlet side of the fan and for communicating a second portion of the cooling air directly to a discharge side of the fan without passing the inlet side.

According to another aspect of the invention, a speed sensor module in an environmental control system includes an outer portion aligned having a first bore aligned on a shaft axis; an intermediate portion having a second bore aligned on the shaft axis; and an inner portion aligned on the shaft axis, the inner portion including a speed sensor for sensing a rotational speed of the shaft; where the outer portion is configured for surrounding each of the intermediate portion and the inner portion within the first bore.

Other aspects, features, and techniques of the invention will become more apparent from the following description taken in conjunction with the drawings.

BRIEF DESCRIPTION OF THE SEVERAL VIEWS OF THE DRAWINGS

Referring now to the drawings wherein like elements are numbered alike in the FIGURES.

DETAILED DESCRIPTION

Embodiments of an environmental control system having an air cycle machine include a speed sensor module configured for connecting to a fan inlet and diffuser assembly, with embodiments being discussed below in detail. The speed sensor module is generally cylindrical in shape and includes a speed sensor residing therein for measuring the rotational speed of a rotating shaft in the air cycle machine. Also, the diffuser assembly is coupled to a cylindrical assembly having a circumference that envelops the distal end of the speed sensor module, thereby creating an ejector gap for diverting the flow of cooling air through the air cycle machine.

Figure 1:
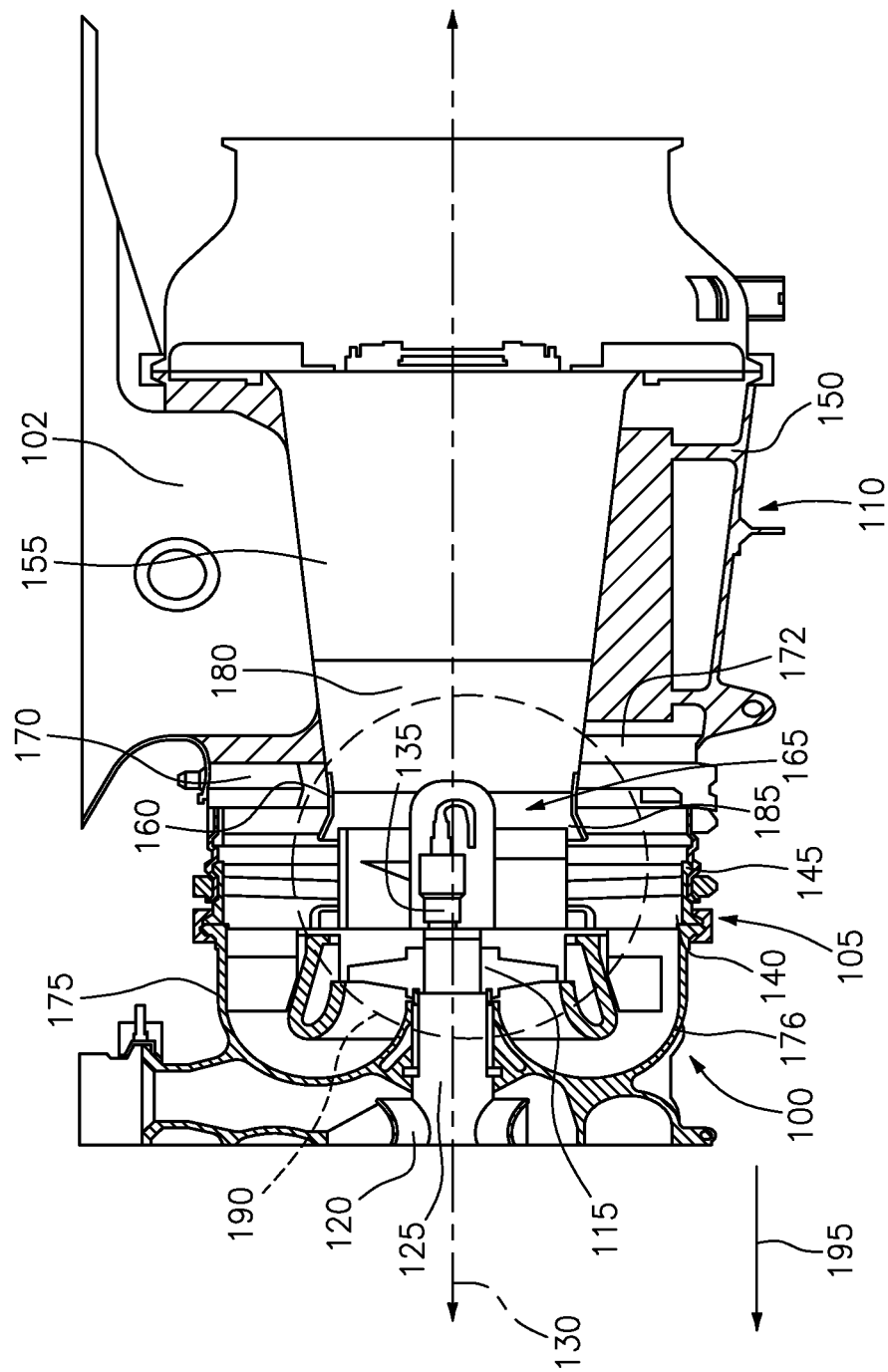
FIG. 1 illustrates a side view, partly in section, of an air cycle machine including a speed sensor module connected to a fan inlet and diffuser assembly according to an embodiment of the invention.

Referring to the drawings, FIG. 1 illustrates an example air cycle machine 100 coupled to a speed sensor module 105 and a fan inlet and diffuser assembly 110 (hereinafter "diffuser assembly 110") according to an embodiment of the invention. Particularly, the air cycle machine 100 includes a fan 115 mounted to a compressor (not shown) and a turbine 120 via a shaft 125, which extends along the central axis 130 of the air cycle machine 100. In an embodiment, the fan 115 and the compressor (not shown) are powered by turbine 120, which rotatably drives the shaft 125 in response to the expansion of the compressed air being conditioned as it passes through the air cycle machine 100. Also shown, the air cycle machine 100 is coupled to a speed sensor module 105 including a speed sensor 135 for measurement of the rotational speed of the shaft 125. The speed sensor module 105 is generally cylindrical in shape and is coupled at its proximal end 140, in one embodiment, to the air cycle machine 100 and at its distal end 145 to the diffuser assembly 110

Also, the speed sensor module 105 is coupled to the diffuser assembly 110 for circulating gaseous cooling ram air through a heat exchanger 102 in an environmental control system (not shown). Particularly, the diffuser assembly 110 includes an axially extending outer housing 150 coupled to an axially extending inner housing 155, both of which are longitudinally aligned along the central axis 130. The diffuser assembly 110 is coupled to, at the proximal end 160, to a generally cylindrical assembly 165 having a circumference that envelops the intermediate cylindrical portion 310 (shown in FIG. 3) of the speed sensor module 105, thereby creating an ejector gap 185 between the intermediate cylindrical portion 310 (shown in FIG. 3) and the cylindrical assembly 165. The cylindrical assembly 165 axially extends in direction 195 away from the diffuser assembly 110 and is coupled to the proximate end 160 of the assembly 165. In another embodiment, the diffuser assembly 110 is provided without the cylindrical assembly 165 and is directly coupled at its proximal end 160 to the distal end 145 of the diffuser assembly 110. Also, the exterior housing 150 facilitates airflow through the inlet flow passageway 170 proximate to the inlet side of the fan 115 and into the semi-toriodal shaped ducts 175, 176 while inner housing 155 facilitates air flow from the inlet flow passageways 170, 172 in and out of the outlet flow passageway 180 through the ejector gap 185, which is shown and described below in FIG. 2. A detailed view of the speed sensor module 105 and diffuser assembly 110 taken along the line 190 is described in more detail below in FIG. 2.

Figure 2:
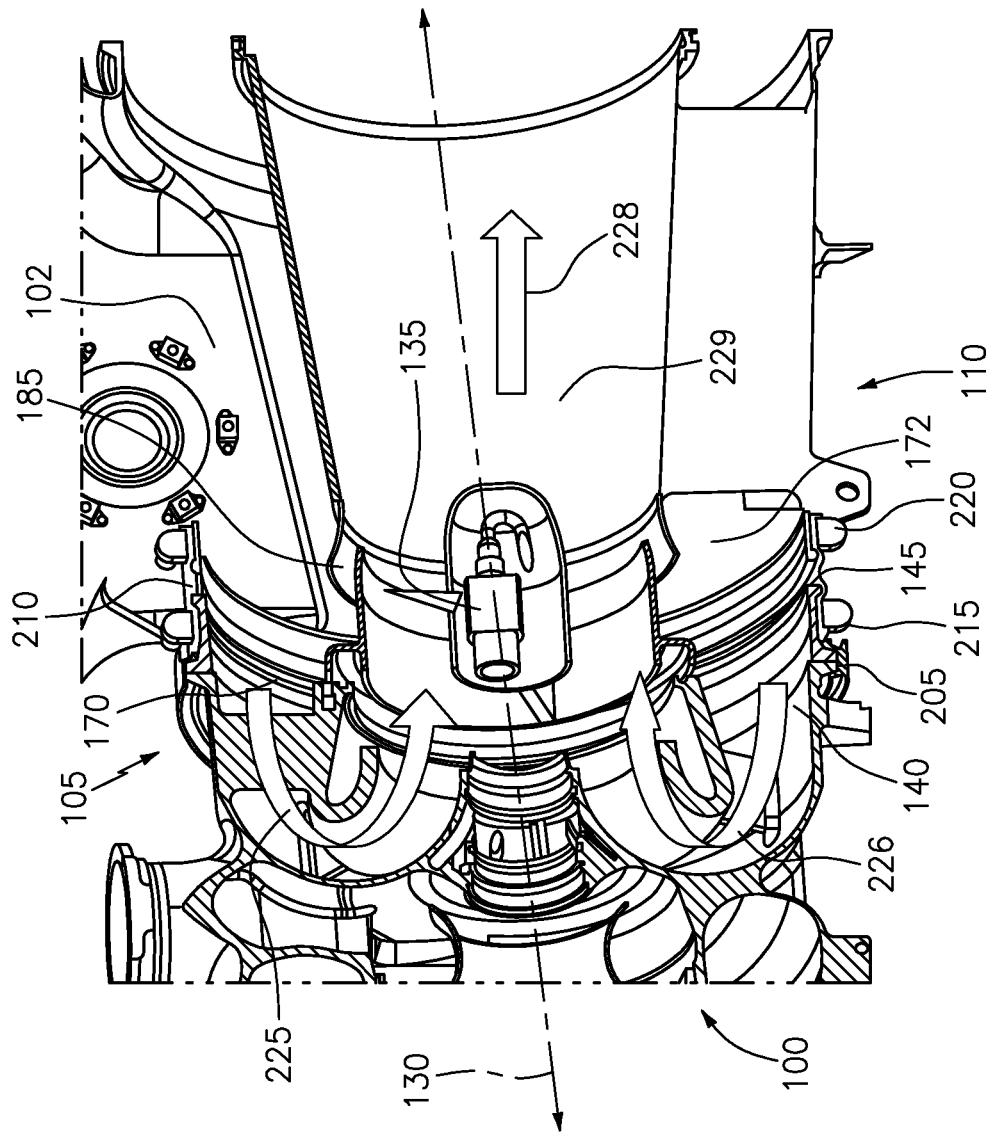
FIG. 2 illustrates an enlarged, perspective sectional view of the air cycle machine shown in FIG. 1 including a speed sensor module connected to the fan inlet and diffuser assembly according to an embodiment of the invention.

FIG. 2 illustrates a detailed partial perspective view of the speed sensor module 105 coupled to the air cycle machine 100 and diffuser assembly 110 according to an embodiment of the invention. Particularly, the speed sensor module 105 is generally cylindrical in shape and includes a speed sensor 135 residing therein along axis 130 for measuring the rotational speed of the shaft 125 (shown in FIG. 1), which is also aligned along the axis 130. The speed sensor module 105 is coupled at its proximal end 140 to the air cycle machine 100 through a V-band clamp 205, which facilitates ease of attachment of the module 105. The speed sensor module 105 is also coupled at is distal end to the diffuser assembly 110 via a flexible cylindrical boot 210 and a plurality of substantially similar clamping devices 215, 220. It is to be appreciated that the speed sensor 135 resides within the speed sensor module 105 and provides for a self contained system, such as a Line Replaceable Unit (LRU), thereby facilitating ease of installation to the air cycle machine 100 as well as simplifying reliability, improving reliability and performance while decreasing system weight.

In operation, and referring to FIGS. 1 and 2, the flow of cooling air, for example ram air, is induced by the rotating fan 115 and drawn from outside the aircraft through an upstream heat exchanger 102 for conditioning an interior space of the aircraft. In one example, the cooling air is drawn into the heat exchanger 102, and thence into the inlet flow passageway 170 proximate to the inlet side of the fan 115 via a diffuser assembly 110. The cooling air entering the passageway 170 is circumferentially distributed as it flows through the passageway 170 towards the proximate end 160 of the diffuser assembly 110. As the cooling air flow approaches the proximate end 160 of the diffuser assembly 110, it divides into two portions with one flow passing through the inlet flow passageways 170, 172 and into the duct 175 along air flow paths 225 and 226 respectively and continues as the discharge air flow path 228 at the discharge side 229 of the fan 115 (FIG. 1). The portion of the flow in the passageways 170, 172 turn 180 degrees and is drawn through the ejector gap 185 by the static pressure differential developed between the flow in passageways 170, 172 and the air flow in path 228 as a second flow during normal operation. During a surge such as, when the heat exchanger is blocked, the air flows from the discharge side 229 into the passageway 170 and helps to prevent a catastrophic failure of the air cycle machine 100. It is to be appreciated that the speed sensor module 105 including the speed sensor 135 is configured for measuring the speed of the rotating shaft 125 (FIG. 1) and facilitates diagnostics of the air cycle machine 100.

Figure 3:
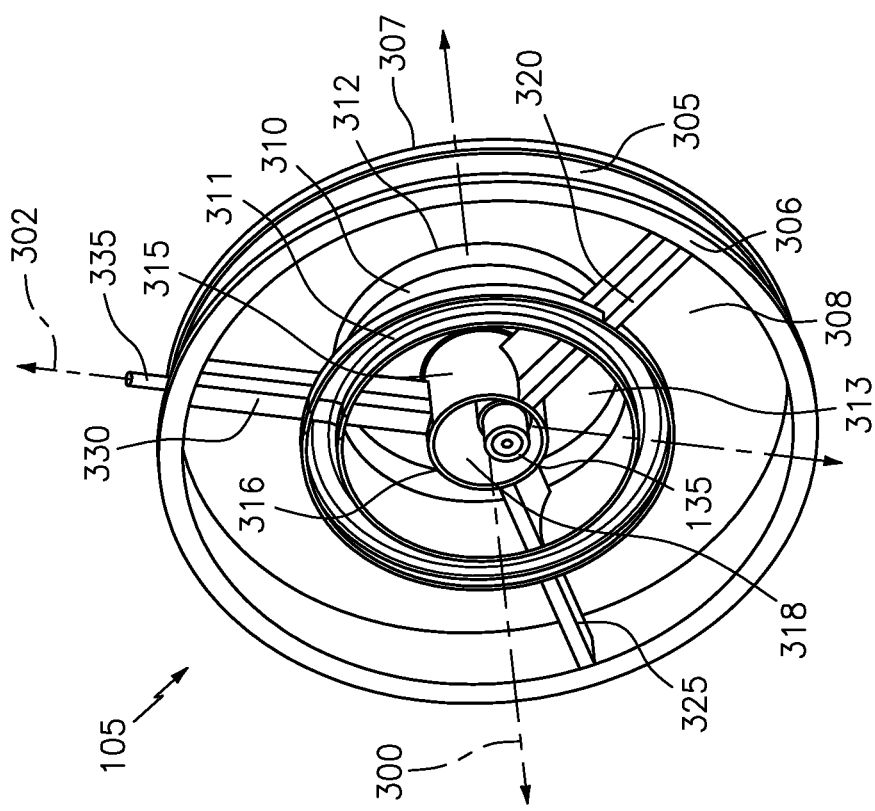
FIG. 3 illustrates a perspective view of the speed sensor module shown in FIGS. 1 and 2 according to an embodiment of the invention.

FIG. 3 illustrates a perspective view of a speed sensor module 105 including a speed sensor 135 according to an embodiment of the invention. Particularly, speed sensor module 105 is generally cylindrical in shape and includes an outer cylindrical portion 305, an intermediate cylindrical portion 310, and an inner cylindrical portion 315 that are all aligned along axis 300. Portion 305 has a generally cylindrical-shaped body portion extending from end 306 to end 307 and includes a bore or cavity 308 aligned along axis 300. Outer cylindrical portion 305 includes intermediate cylindrical portion 310 and inner cylindrical portion 315 within its bore 308. Intermediate cylindrical portion 310 also has a generally cylindrical body that extends from end 311 to end 312 and includes a bore 313 aligned along axis 300. Bore 313 includes inner cylindrical portion 315. Inner cylindrical portion 315 is generally cylindrical in shape and extends from an open end 316 to a diametrically opposed closed end (not shown), and includes a cavity 318 that is aligned along axis 300. Portion 315 encloses a volume within cavity 318, which is provided to receive speed sensor 315. Further, each of the portions 305, 310, 315 are coupled to, in one embodiment, a plurality of airfoils 320, 325, and 330, which are symmetrically coupled to each of the portion 305, 310, 315 and emanate from axis 300 outwardly and terminate at outer cylindrical portion 305. In another embodiment, additional airfoils, such as airfoil 330, may be provided for speed sensor module 105. Each airfoil 320, 325, and 330 reside on respective longitudinal axes that is orthogonal to axis 300 of each of portion 305, portion 310, and portion 315. In one embodiment, air foil 330 includes a longitudinally coextensive inner cavity or aperture (not shown) aligned along axis 302 that emanates inside cavity 318 and traverses each of the portions 305, 310, 315 to provide a channel or groove for receiving one or more connecting wires 335 and electrically connecting the speed sensor 135 to an aircraft (not shown). It is to be appreciated that the speed sensor module 105 is coupled to the air cycle machine 100 at end 306 and speed sensor 135 provides for measuring the rotation of shaft 125 (FIG. 1) as the cooling air traverses through each of the cylindrical portions 305, 310, 315 and into the diffuser assembly 110.

Figure 4:
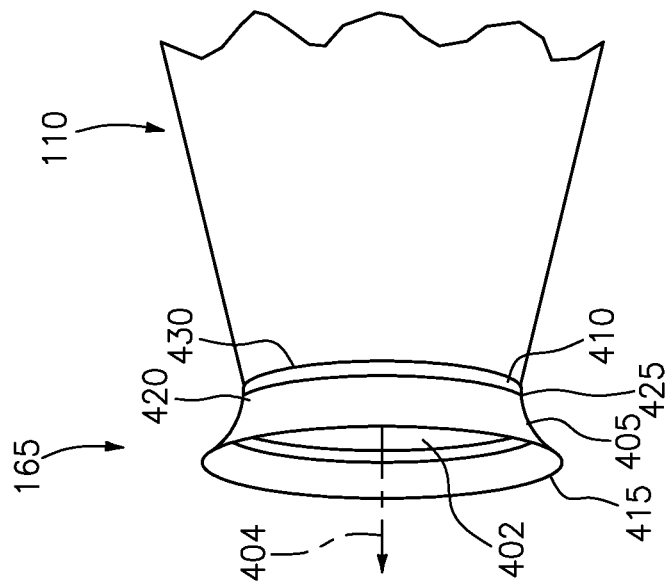
FIG. 4 illustrates a partial perspective view of the fan inlet and diffuser assembly shown in FIGS. 1 and 2 according to an embodiment of the invention.

FIG. 4 illustrates a partial perspective view of a cylindrical assembly 165 of a diffuser assembly 110 according to an embodiment of the invention. Particularly, diffuser assembly 110 is coupled, at the proximal end 160, to a generally cylindrical assembly 165 in order to create an ejector gap 185 between the sensor module 105 (shown in FIG. 1) and the diffuser assembly 110 (also shown in FIG. 1). The cylindrical assembly 165 has a through bore 402 aligned along bore axis 404 and includes a proximate portion 405 coupled to a distal portion 410. The proximate portion 405 has a generally cylindrical shaped body from a first end 415 having a first diameter that terminates into a second end 420 having a second internal diameter. In one embodiment, the first diameter is larger than the second diameter thereby creating a tapered portion 405. However, in another embodiment, proximate portion 405 may have a uniform diameter from first end 415 to second end 420. Also, proximate portion 405 is coupled to distal portion 410 at end 420. Distal portion 410 is also generally cylindrical in shape and is coupled, at its proximate end 425, to proximate portion 405 and at its distal end 430 to the proximal end 160 of the diffuser assembly 110. In embodiments, the internal diameter of the distal portion 410 may be uniform from end 425 to end 430, or tapered to conform to the diameter of the proximal end 160.

The technical effects and benefits of exemplary embodiments include an air cycle machine coupled to a speed sensor module and a fan inlet and diffuser assembly. Also, the diffuser assembly is coupled to a cylindrical assembly having a circumference that envelops the distal end of the speed sensor module, thereby creating an ejector gap.

The terminology used herein is for the purpose of describing particular embodiments only and is not intended to be limiting of the invention. While the description of the present invention has been presented for purposes of illustration and description, it is not intended to be exhaustive or limited to the invention in the form disclosed. Many modifications, variations, alterations, substitutions, or equivalent arrangement not hereto described will be apparent to those of ordinary skill in the art without departing from the scope and spirit of the invention. Additionally, while various embodiment of the invention have been described, it is to be understood that aspects of the invention may include only some of the described embodiments. Accordingly, the invention is not to be seen as limited by the foregoing description, but is only limited by the scope of the appended claims.

The invention claimed is:

1. An environmental control system, comprising:
    an air cycle machine for conditioning an interior space with cooling air, the air cycle machine including a fan coupled to a shaft that rotates about a shaft axis, the fan being located at a distal end of the air cycle machine;
    a speed sensor module having a speed sensor for sensing a rotational speed of the shaft; wherein the speed sensor module includes an outer portion having a first bore aligned on the shaft axis, an intermediate portion having a second bore aligned on the shaft axis, an inner portion aligned on the shaft axis, a proximal end of the speed sensor module, and a distal end of the speed sensor module; and
    a diffuser assembly including a cylindrical assembly for ducting a first portion of the cooling air to an inlet side of the fan and for communicating a second portion of the cooling air directly to a discharge side of the fan without passing the inlet side, wherein the proximal end of the speed sensor module is coupled to the air cycle machine and the distal end of the speed sensor module is coupled to the diffuser assembly.

2. The environmental control system of claim 1, wherein the outer portion includes a first end proximate to the distal end of the air cycle machine and a second end diametrically opposite the first end.

3. The environmental control system of claim 1, wherein the cylindrical assembly is operatively coupled to the diffuser assembly for facilitating the communicating of the second portion of the cooling air.

4. The environmental control system of claim 1, wherein the outer portion is configured for receiving each of the intermediate portion and the inner portion within the first bore.

5. The environmental control system of claim 1, wherein the intermediate portion is configured for receiving the inner portion within the second bore.

6. The environmental control system of claim 1, further comprising at least one air foil traversing each of the outer, intermediate, and inner portions.

7. The environmental control system of claim 6, wherein a longitudinal axis of the at least one air foil is orthogonal to of the shaft axis of each of the outer, intermediate, and inner portions.

8. The environmental control system of claim 6, wherein the at least one air foil comprises an aperture that is longitudinally coextensive with a body portion of the at least one air foil.

9. The environmental control system of claim 8, wherein the aperture is configured for receiving an electrical connection for the speed sensor.

10. The environmental control system of claim 1, wherein the speed sensor module is configured for receiving the speed sensor within an inner cavity located in the inner portion.

11. The environmental control system of claim 2, wherein the cylindrical assembly includes a first cylindrical portion proximate to the second end of the speed sensor module and at least a second cylindrical portion diametrically opposed to the first cylindrical portion, wherein the first cylindrical portion being coupled to the second cylindrical portion and including a second bore aligned along a second bore axis.

12. The environmental control system of claim 1, wherein the diffuser assembly comprises an axially extending outer housing configured for mounting to the outer portion of the speed sensor module and an axially extending inner housing disposed coaxially within the outer housing, the inner housing being configured for connecting to the second cylindrical portion.

13. A speed sensor module in an environmental control system, comprising:
    an outer portion aligned having a first bore aligned on a shaft axis;
    an intermediate portion having a second bore aligned on the shaft axis;
    an inner portion aligned on the shaft axis, the inner portion including a speed sensor for sensing a rotational speed of the shaft;
    a proximal end of the speed sensor module; and
    a distal end of the speed sensor module;
    wherein the outer portion is configured for surrounding each of the intermediate portion and the inner portion within the first bore, and the proximal end of the speed sensor module is configured to be coupled to an air cycle machine and the distal end of the speed sensor module is configured to be coupled to a diffuser assembly.

14. The speed sensor module of claim 13, wherein the intermediate portion is configured for surrounding the inner portion within the second bore.

15. The speed sensor module of claim 13, further comprising at least one air foil traversing each of the outer, intermediate, and inner portions.

16. The speed sensor module of claim 15, wherein the at least one air foil is orthogonal to a tangent at respective surfaces of each of the outer, intermediate, and inner portions.

17. The speed sensor module of claim 15, wherein the at least one air foil comprises an aperture that is longitudinally coextensive with a body portion of the at least one air foil.

18. The speed sensor module of claim 17, wherein the aperture is configured for receiving an electrical connection for the speed sensor.

19. The speed sensor module of claim 13, wherein the speed sensor module is configured for receiving the speed sensor within an inner cavity disposed in the inner portion.

* * * * *